(12) United States Patent
Bartenstein et al.

(10) Patent No.: US 8,402,421 B2
(45) Date of Patent: Mar. 19, 2013

(54) METHOD AND SYSTEM FOR SUBNET DEFECT DIAGNOSTICS THROUGH FAULT COMPOSITING

(75) Inventors: Thomas Webster Bartenstein, Owego, NY (US); Joseph Michael Swenton, Owego, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 38 days.

(21) Appl. No.: 12/903,035

(22) Filed: Oct. 12, 2010

(65) Prior Publication Data
US 2012/0089872 A1   Apr. 12, 2012

(51) Int. Cl.
*G06F 17/50* (2006.01)
*G06F 9/455* (2006.01)
*G06F 11/22* (2006.01)
*G06F 11/00* (2006.01)

(52) U.S. Cl. .......... 716/136; 716/134; 716/106; 714/25; 714/33; 714/47.1; 714/E11.167

(58) Field of Classification Search ........................ None
See application file for complete search history.

(56) References Cited

U.S. PATENT DOCUMENTS

| | | | |
|---|---|---|---|
| 6,536,007 B1 | 3/2003 | Venkataraman | |
| 7,057,395 B1 | 6/2006 | Williamson | |
| 7,913,144 B2 | 3/2011 | Wen et al. | |
| 2007/0234161 A1 | 10/2007 | Blanton et al. | |
| 2009/0177936 A1* | 7/2009 | Koenemann et al. | 714/737 |
| 2010/0088560 A1* | 4/2010 | Chakravarthy et al. | 714/724 |

OTHER PUBLICATIONS

A. Stamper, T. L. McDevitt, and S. L. Luce, "Sub-0.25-micron interconnect scaling: Damascene copper versus subtractive aluminum", Proc. IEEE Advanced Semiconductor Manufacturing Conf., pp. 337-346, Sep. 1998.
K. M. Thompson, "Intel and the myths of test", *IEEE Des. Test. Comput.*, vol. 13, No. 1, pp. 79-81, 1996.
M. Renovell, G. Cambon, "Topology Dependence of Floating Gate Faults in MOS Integrated Circuits," Electronics Letters, vol. 22, No. 3, pp. 152-153, 1986.
C.L. Henderson, J.M. Soden and C.F. Hawkins, "The Behavior and Testing Implications of CMOS IC Open Circuits", Proceedings of the International Test Conference, pp. 302-303, 1991.
S. Johnson, "Residual charge on the faulty floating gate CMOS transistor", Proceedings of the International Test Conference, pp. 555-561, 1994.
V.H. Champac, A. Rubio, J. Figueras, "Electrical model of the floating gate defect in CMOS ICs: implications on IDDQ testing", Transactions on Computed Aided Design of Integrated Circuits and Syst, vol. 13, Is 3, pp. 359-369, 1994.
S. Rafiq, A. Ivanov, S. Tabatabaei, M. Renovell, "Testing for floating gates defects in CMOS circuits", Proceedings of the Asian Test Sympos., pp. 228-236, 1998.

(Continued)

*Primary Examiner* — A. M. Thompson
(74) *Attorney, Agent, or Firm* — Dickstein Shapiro LLP

(57) ABSTRACT

A method and system for subnet defect diagnostics through fault compositing is disclosed. A testing apparatus generates callout data for an integrated circuit device under test. A computer received the callout data, which includes a list of faults. Each fault of the list of faults has associated with it one or more failures and/or conflicts. In order to explain the failures, two or more faults are selected and composited, yielding a composite fault having a composite conflict count. The composite fault is assigned a score based on the composite conflict count, which score determines a candidate composite that best explains the faults of the list of faults. This procedure may be repeated to explain all the failures.

21 Claims, 5 Drawing Sheets

OTHER PUBLICATIONS

H. Konuk, "Voltage and current-based fault simulation for interconnect open defects", IEEE Transactions on Computed Aided Design of integrated circuits and systems, vol. 18, No. 12, pp. 1768-1779, 1999.

V.H. Champac, A. Zenteno, A., "Detectability conditions for interconnection open defects", Proceedings of VLSI Test Symposium, pp. 305-311, 2000.

D. Arumi, R. Rodriguez-Montañés, J. Figueras, "Experimental Characterization of CMOS Interconnect Open Defects", IEEE Trans. Comp.-Aided Design, vol. 27, Issue 1, pp. 123-136, Jan. 2008.

H. Yotsuyanagi et al, "Fault Effect of Open Faults Considering Adjacent Signal Lines in a 90 nm IC", *International Conference on VLSI Design*, pp. 91-96, 2009.

Lavo, D.B.; Larrabee, T.; Chess, B.; "Beyond the byzantine generals: unexpected behavior and bridging fault diagnosis", Proceedings of the International Test Conference, pp. 611-619, 1996.

Venkataraman, S.; Drummonds, S.B.; "Poirot: applications of a logic fault diagnosis tool", IEEE Design & Test of Computers, vol. 18, Is. 1, Jan.-Feb. pp. 19-30, 2001.

Liu, J.B., Veneris, A., Takahashi, H., 2002, Incremental Diagnosis of Multiple Open-Interconnects, *International Test Conference*, pp. 1085-1092.

Shi-Yu Huang; "Diagnosis of Byzantine open-segment faults [scan testing]", Proceedings of the Asian Test Symposium, pp. 248-253, 2002.

Sato, Y.; Yamazaki, L.; Yamanaka, H.; Ikeda, T.; Takakura, M., 'A Persistent Diagnostic Technique for Unstable Defects', Proceedings of the International Test Conference, pp. 242-249, 2002.

Rodriguez-Montañés, R., Arumi, D., Figueras, J., Eichenberger, S., Hora, C., Kruseman, B., Lousberg, M., Majhi, A.K., 2007a, Diagnosis of Full Open Defects in Interconnecting Lines, VLSI Test Symposium, pp. 158-166.

Zou, W., Cheng, W.-T., Reddy, S.M., "Interconnect Open Defect Diagnosis with Physical Information", *Asian Test Symposium*, pp. 203-209, 2006.

K. Yamazaki et al, "A Novel Approach for Improving the Quality of Open Fault Diagnosis", *International Conference on VLSI Design*, pp. 85-90, Jan. 5-9, 2009.

R. Rodriguez-Montanes et al, "Diagnosis of Full Open Defects in Interconnect Lines with Fan-out", *Test Symposium (ETS)*, 2010 15$^{th}$ *IEEE European*, pp. 233-238, May, 24-28, 2010.

* cited by examiner

METHOD AND SYSTEM FOR SUBNET DEFECT DIAGNOSTICS THROUGH FAULT COMPOSITING

FIELD

The field of the invention relates generally to hardware and software verification of logic circuits and more particularly relates to a method and system for diagnosing defects through fault simulation and compositing scores.

BACKGROUND

Manufactured semiconductor chips may have defects. Those defective chips are tested and diagnosed by identifying the location and nature of the defects. Using a fault simulation technique, the defects are modeled as faults to determine which fault best matches or approximates the failing measures from the defects. Simulated faults are generally assigned a score to indicate how well the effects of the faults correlate to miscomparing measures detected by a tester. The best scoring fault is selected as the best model of the defect. The higher the score is, the better the fault models not only the location but also the nature of the defect. However, it is not practical to model all defects as faults.

Fault models include the stuck or stuck-at-fault model. The stuck-at-fault model models a faulted pin in a design that always produces a logic zero (for a stuck-at-zero fault) or a logic one (for a stuck-at-one fault). In order to detect the presence of a defect in the design that acts like a stuck-at-fault, the value at the faulted pin in the defective (stuck-at) state must be different from the value that should appear on that pin during the test. For instance, if the pin is expected to be at a one value in a specific state, then the stuck-at-zero fault models the difference on that pin in that state, whereas the stuck-at-one fault does not model the difference. Furthermore, the difference must be propagated to a point in the circuit at which the fault is measured. Typically, in the case of a fan-out net, a net with a single driver pin and multiple receiver pins, a stuck fault model consists of stuck faults on the driver pin of the net and stuck faults on the receiver pins on the net. Because there are no pins on internal sections of a fan-out net, the stuck fault does not model a defect on a net that feeds multiple receivers where the defective part of the net feeds only a subset of the receivers. Conventional diagnostics cannot achieve a high score with stuck fault models for such a defect that does not match a single logical pin stuck at either zero or one.

There are two approaches to resolve this problem. The first approach is to create a fan-out subnet fault model based on the logical design. In this approach, a fault is defined for each subset of fan-out receivers for each fan-out net. These faults are simulated, and the fan-out fault that best matches the values measured on a defective chip is used to model the defect in a subnet that feeds the subset of that net's fan-out receivers.

The fan-out subnet fault model is limited in that the number of faults to be modeled and simulated is impractical for a typical chip design. For instance, for a single net that has eight receivers, there are $2^8-1$ or 255 combinations of receivers. Therefore, the total of 255 faults needs to be modeled. A typical circuit design has millions of nets, and it is not uncommon for some of these nets to fan out to hundreds of receivers. As the number of subnets and receivers increases, the number of subnet faults that need to be modeled and simulated grows exponentially. The number of faults becomes too large for practical modeling and simulation of modern chip designs.

The second approach is to analyze a physical circuit design to determine a set of receivers that a specific subnet feeds. Subnet faults are created only for those sets of receivers fed by a common subnet. This reduces the number of modeled faults. The modeled faults are simulated to determine the fault that best models the defect.

This approach is, however, limited in that it requires a physical circuit design and a methodology to map the physical circuit design to the nets and pins in a fault simulation model. When chips are manufactured, the mapping information between the physical design and the nets and pins in the fault simulation model may be lost or become unavailable. Even if the mapping information is available, it may be too expensive to recreate.

The various embodiments described herein enable identification of a subnet defect by compositing two or more faults without modeling or simulating any subnet faults respectively, thus overcomes the above-identified limitations.

SUMMARY

A method and system for subnet defect diagnostics through fault compositing is disclosed. Test patterns are fault-simulated with a predefined fault model. The results of the fault-simulation are compared to the failures measured at a tester, and callout data is generated.

According to one embodiment, callout data comprising a plurality of faults is received. Each fault of the plurality of faults comprises "explained failure" data and conflict count. Failure data is a multiplicity of miscomparing measures produced by one or more defects, and captured by a tester. The "explained failure" data for a specific fault identifies a subset of failures that the fault predicts. A "conflict" indicates that the fault predicts a miscompare that was not contained in the failure data.

It is determined how well a specific fault models a defect by comparing the explained failures with the full set of failures, and analyzing the conflict data. A fault that is good at modeling a defect explains most or all of the failures, and has a low conflict count. A "fault composite" is created to estimate the explained failure data and the conflict count for a "virtual fault" that is not simulated, but behaves like a multiplicity of faults that are simulated. The failures explained by two or more simulated faults are unioned to estimate the failures that would have been explained had all those faults been present simultaneously. Furthermore, the conflict count of the faults is summed to estimate the conflict count that would have occurred had all faults been present simultaneously. Once the virtual fault explained failure data and conflict count have been estimated, a score is calculated for this virtual fault using the same scoring mechanism used to score each of the simulated faults.

This fault compositing technique is applied to a case where a defect is in a specific subnet of a fan-out net, and the defect feeds a subset of the sinks of the fan-out net. For instance, if a subnet feeds two out of four sinks of the net, the defect behaves like the composite of the stuck faults on the two affected sinks of the fan-out net. A first fault on a first fan-out sink of a fan-out net that explains at least one of the failures is selected as a root of a composite fault. The other sinks of the fan-out net are examined to see if they exhibit a fault that explains more failures than the first fault. If there is a second sink of the fan-out net that exhibits such a fault, a composite is created from the original fault and the fault on the second sink. This process is continued to add a third fault on a third sink to the composite fault that explains at least the first failure and additional failures. The process is completed when no similar faults on any of the sinks of the fan-out net explain more failures than those explained by the composite. A composite conflict count is generated by combining the conflict count of the first fault and the conflict count of the second fault, and a score is assigned to the composite fault. A best candidate composite fault is determined based on the score. The compositing steps are repeated until the composite fault explains the highest possible number of the plurality of failures.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments of and together with the general description given above and the detailed description of the preferred embodiment given below serve to explain and teach the principles of the present invention.

Figure 1:
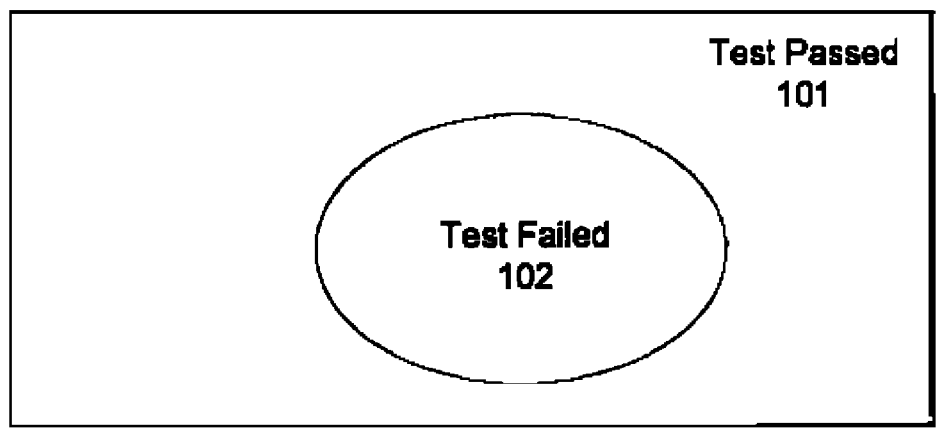
FIG. 1 is a graphical illustration of an exemplary test result measured by a tester, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for subnet defect diagnostics through fault compositing is disclosed. Test patterns are fault-simulated with a predefined fault model. The results of the fault-simulation are compared to the failures measured at a tester, and callout data is generated.

According to one embodiment, callout data comprising a plurality of faults is received. Each fault of the plurality of faults comprises "explained failure" data and conflict count. Failure data is a multiplicity of miscomparing measures produced by one or more defects, and captured by a tester. The "explained failure" data for a specific fault identifies a subset of failures that the fault predicts. A "conflict" indicates that the fault predicts a miscompare that was not contained in the failure data.

It is determined how well a specific fault models a defect by comparing the explained failures with the full set of failures, and analyzing the conflict data. A fault that is good at modeling a defect explains most or all of the failures, and has a low conflict count. A "fault composite" is created to estimate the explained failure data and the conflict count for a "virtual fault" that is not simulated, but behaves like a multiplicity of faults that are simulated. The failures explained by two or more simulated faults are unioned to estimate the failures that would have been explained had all those faults been present simultaneously. Furthermore, the conflict count of the faults is summed to estimate the conflict count that would have occurred had all faults been present simultaneously. Once the virtual fault explained failure data and conflict count have been estimated, a score is calculated for this virtual fault using the same scoring mechanism used to score each of the simulated faults.

This fault compositing technique is applied to a case where a defect is in a specific subnet of a fan-out net, and the defect feeds a subset of the sinks of the fan-out net. For instance, if a subnet feeds two out of four sinks of the net, the defect behaves like the composite of the stuck faults on the two affected sinks of the fan-out net. A first fault on a fan-out sink of a fan-out net that explains a first failure is selected from the callout data. A second fault on a different sink that is consistent with a defect in a subnet that feeds both the first and second sink of the fan-out net that explains a second failure that the first fault does not explain is selected. The first fault and the second fault are composited to yield a composite fault. The composite fault unions the failures explained by the first fault with the failures explained by the second fault. A composite conflict count is generated by combining the conflict count of the first fault and the conflict count of the second fault, and a score is assigned to the composite fault. A best candidate composite fault is determined based on the score. The compositing steps are repeated until the composite fault explains the highest possible number of the plurality of failures.

Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the present invention. However, it will be apparent to one skilled in the art that these specific details are not required to practice the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Fault-simulation is a diagnostic process for detecting and locating faults on a circuit. For example, a stuck-at-zero fault models a defect where a specific pin-out is supposed to zero but is stuck at zero. Similarly, a stuck-at-one fault on that same pin models a defect where that pin-out is stuck at one when the output is supposed to be at zero.

According to one embodiment, a composite fault diagnostic algorithm is employed to composite faults without modeling the behavior of each subnet as an independent fault. The composite fault diagnostic algorithm composites two or more modeled faults and evaluates the effects of a composite of defects that exhibit the behaviors of each components of the composite fault at the same time. For example, a stuck-at-zero fault may be composited with a stuck-at-one fault, and modeled as an inverter. An inverter measures the pin-out as one when it is supposed to be zero, and zero when it is supposed to be one. The composite fault diagnostic algorithm evaluates the effects of a composite of defects and efficiently models a composite of defects without respectively simulating the fault components of the composite fault.

According to one embodiment, faults modeled on subsets of receivers are composited. A receiver is added to a composite fault if the fault on that receiver improves the correlation of the defect measured on a defective chip. Multiple candidate composite faults are evaluated, and the composite fault exhibiting the highest correlation, for example lowest conflict count, is selected for modeling the defect.

During a fault simulation, test data is kept with each existing fault that was simulated (e.g., stuck-at-one, stuck-at-zero, or any other modeled fault). On each measure point, three values v1, v2, and v3 are obtained and compared to each other to determine the state of fault. V1 is the predicted value that would occur in the circuit if it behaves correctly; v2 is the actual value that appeared on the measure point; and v3 is a defective value predicted by a fault model.

After fault simulation, each measure point is classified into one of four classes: TFSD (Tester Failed, Simulator Detected), TPSD (Tester Passed, Simulation Detected), TFSU (Tester Failed, Simulator Undetected), and TPSU (Tester Passed, Simulator Undetected). TFSD and TPSD are particularly important to determine how well a fault models a defect; TFSD indicates how many failures from the tester were predicted by this fault, and TPSD indicates how many failures were predicted by this fault that did not occur at the tester. TFSD refers to a fault that has a mismatch between the predicted value and the actual value but the defect is correctly identified by fault simulation. That is:

$$v1 \neq v2, \text{ and } v2=v3;$$

On the other hand, TPSD measures the count of the number of measures where the tester did not measure a miscompare (no defect detected), but the simulation of the fault predicted a miscompare. That is:

$$v1=v2, \text{ and } v2 \neq v3.$$

TPSD is also referred to as over-predictions.

Fault compositing creates a union of TFSD for all composite faults to determine a composite TFSD and a union of TPSD components to determine a composite TPSD. The composite TFSD and composite TPSD are used to determine how well the composite of the component faults matches the failures measured at the tester. A good scoring fault has a relatively high TFSD value, and a relatively low TPSD value.

Due to the amount of fault simulation data to be obtained for modern chips, it is not practical to keep all the fault simulation prediction data. One of the solutions is to union or composite the faults. Compositing typically approximates the size of unioned TPSD values by adding the counts of TPSDs for fault components.

An exemplary pseudo-code for constructing a composite fault is shown below.

```
For each fault simulated {
    Go to the next fault if this fault is marked as 'visited';
    Mark this fault as 'visited';
    Go to the next fault if this fault has no TFSDs;
    Go to the next fault is this fault is not on the receiver pin of a
    net which fans out;
    Initialize the composite with this fault;
    For each receiver pin on this net {
        Find the fault associated with this pin;
        Go to next receiver pin if the associated fault is
        marked as 'visited';
        Mark the associated fault as 'visited';
        If the associated fault has a TFSD that is not already in the
        composite, add the associated fault to the composite;
    }
    Go to the next fault if the composite only contains one component
    (this 'composite' is already modeled by a single fault);
    Go to the next fault if the composite contains a fault for every
    receiver pin on the net (this 'composite' is modeled by a
    fault on the driver pin);
    Report on this composite fault;
}.
```

A fault-simulation determines the root cause of a failure caused by a defect in an integrated circuit. In one embodiment, a failure measured in the circuit that matches the characteristic of any given fault is isolated using a stuck-at-fault model. The stuck-at-fault model provides a tractable and manageable set of faults to simulate them in a reasonable amount of time, even for a large circuit. The stuck-at-fault model is effective at providing target stimuli for an automatic test pattern generation (ATPG) software.

Complex fault models incur greater cost in fault definition and/or simulation time. As integrated circuits become larger, denser, more complex, and faster, simplifying assumptions that are built into the stuck-at-fault model deteriorate as a fault model for efficient diagnostics. The present invention provides a methodology for generating fault information using a fault model, and diagnosing more complex faults using the fault information. This methodology also allows for diagnosis of complex faults including non-stuck-at faults using the results of a stuck-at-fault simulation. For example, this methodology can be used to composite a fault that models a slow-to-rise or slow-to-fall defect on subsets of a fan-out sink as well as stuck faults.

According to one embodiment, each fault contained in callout data is isolated to generate a composite fault. The process of fault isolation compares the failures measured at a tester with the behavior and/or characteristic of faults in a fault model. The test patterns at measure points (e.g., latches or primary outputs) are monitored to detect failures. The measured failures are compared with a modeled fault (or faults) at each measure point. A "perfect" fault isolation occurs when a fault explains every failure that was measured at a tester, and the fault does not predict any other failures that were not measured at the tester.

FIG. 1 is a graphical illustration of an exemplary test result measured by a tester, according to one embodiment. The field of measures contains a set of all valid cross product of patterns and measure locations. A subset of this field contains the patterns and measure locations of a fault that failed at the tester. This subset is referred to as "Tester Failed" (TF) 102. The complement of this set is a set of all patterns and measure locations where failures were not measured. This set is referred to as "Tester Passed" (TP) 101.

Figure 2:
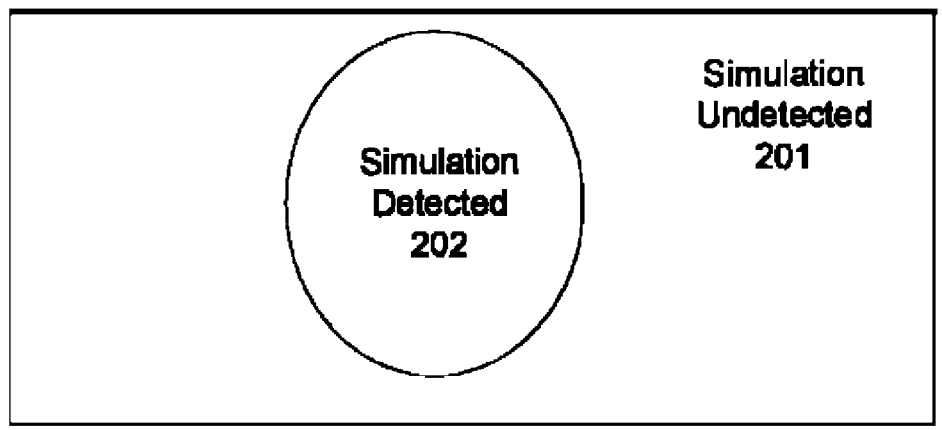
FIG. 2 is a graphical illustration of an exemplary result by a diagnostic fault simulation, according to one embodiment.

FIG. 2 is a graphical illustration of an exemplary result by a diagnostic fault simulation, according to one embodiment. Each fault under simulation results in a set of test patterns and measure locations where at least one fault effect was detected. This set is referred to as "Simulation Detected" (SD) 202. The complement of this set contains all the patterns and locations where a fault was not detected and is referred to as "Simulation Undetected" (SU) 101.

Fault isolation is performed by comparing failures in a set of TF 102 with faults SD 202 detected by a fault-simulation. If TF 102 is exactly the same as SD 202 for a certain fault, the fault successfully explains the failure, and is a good candidate fault model for the defect that caused the failure. When there is no single stuck-at-fault that exactly predicts the measured failure, fault isolation is required to deal with four separate regions in the field of all failures.

Figure 3:
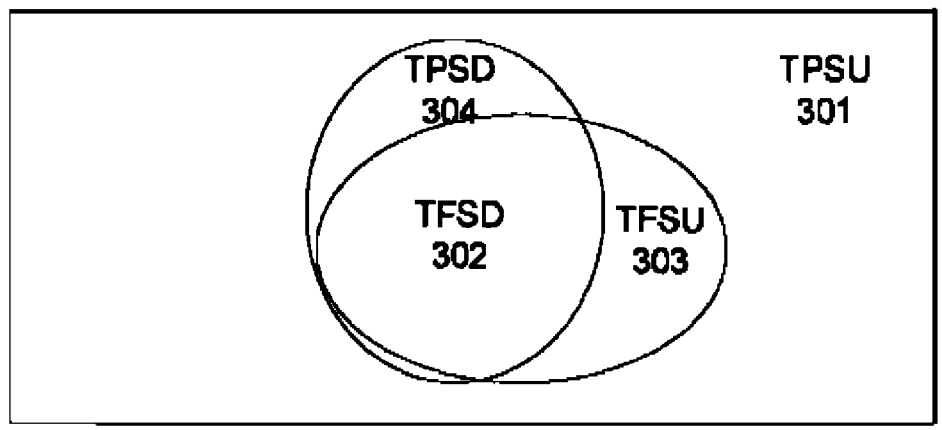
FIG. 3 is a graphical illustration of a comparison of a fault simulation to failure data, according to one embodiment.

FIG. 3 is a graphical illustration of a comparison of a fault simulation to failure data, according to one embodiment. The region where a failure was measured and simulation correctly explained the failure is the intersection of TF 102 and SD 202, and is referred to as TFSD 302. The region where at least one failure was measured at the tester, but the fault simulation did not detect the failure is the intersection of TF 102 and SU 201, and is referred to as TFSU 303. The region where the fault explained failures, but no failures were measured is the intersection of TP 101 and SD 202, and is referred to as TPSD 304. The region where no failures were measured, and simulation did not predict failures is the intersection of TP 101 and SU 201, and is referred to as TPSU 301.

A fault model describes measured failures at a tester and the associated fault effects as a set of tuples. In one embodiment, each tuple contains three fields: pattern, measure location, and failing value. The field for failing value may be not required if the fault simulation generates composite diagnostic scores performed with a two-valued calculus, namely zero and one. As a simplifying assumption, failing values are described herein using a binary logic (i.e., zero or one), however it is understood that all the constructs described herein can be easily generalized to a tri-phase or a multi-phase logic.

According to one embodiment, faults are assigned a score to determine how well the effect of a specific fault model matches a failure measured by a tester. The score is determined by various factors. For example, the score is calculated based on the fraction of the failures predicted by a fault simulation, typically represented by the ratio of TFSD 302 with respect to TF 102 (TFSD/TF). TPSD 304 may also be used to calculate the score. TPSD 304 measures the number of false faults that are not measured by a tester but are detected by a fault simulation. The score may be calculated by combining these two factors. In some cases, TPSD 304 is considered less important than TFSD 302 since fault activation and propagation do not always match the idealized environment modeled by a fault simulation. For example, a scoring scheme is employed that reduces the weight of TPSD 302, for example by a factor of 10:

$$\text{score}=TFSD/(TF+TPSD/10).$$

Composite Diagnostic Scores

A conventional stuck-at-fault model detects only a subset of behaviors that are observable from an arbitrary defect. Other defects that are modeled by the composite behavior of one or more concurrently occurring stuck-at-faults are referred to as composite faults. For instance, a defect that behaves like an inverter at a single internal location in a circuit may be modeled with the combination of a stuck-at-zero fault and a stuck-at-one fault. When the expected value at the node is a zero but the circuit produces a one, the circuit behaves like a stuck-at-one fault while the stuck-at-zero fault is inactivated. When the expected circuit value is a one but the circuit produces a zero, the circuit behaves like a stuck-at-zero fault while the stuck-at-one fault is inactivated. The composite of the stuck-at-zero fault and the stuck-at-one fault well mimics the behavior of an inverting fault that is not modeled. The node's behavior, therefore, is used to generate a composite fault without explicitly simulating each fault component of the un-modeled inverting fault.

Since a diagnostic simulation isolates faults by comparing the simulated fault against the failure data from a tester, it is difficult to determine when and where the composite fault is detected. This is because the simulation of the component stuck faults may be based on the behavior of a single stuck fault that affects the activation or propagation of another stuck fault. These effects caused by the single stuck fault may prevent detection of the composite fault even if one of the fault components is detected, or may allow detection of the composite fault when neither of the fault components was detected. In practice, such an interaction between two or more stuck faults is unlikely to occur, and, if it does, may occur at a small number of the detected faults.

Figure 4:
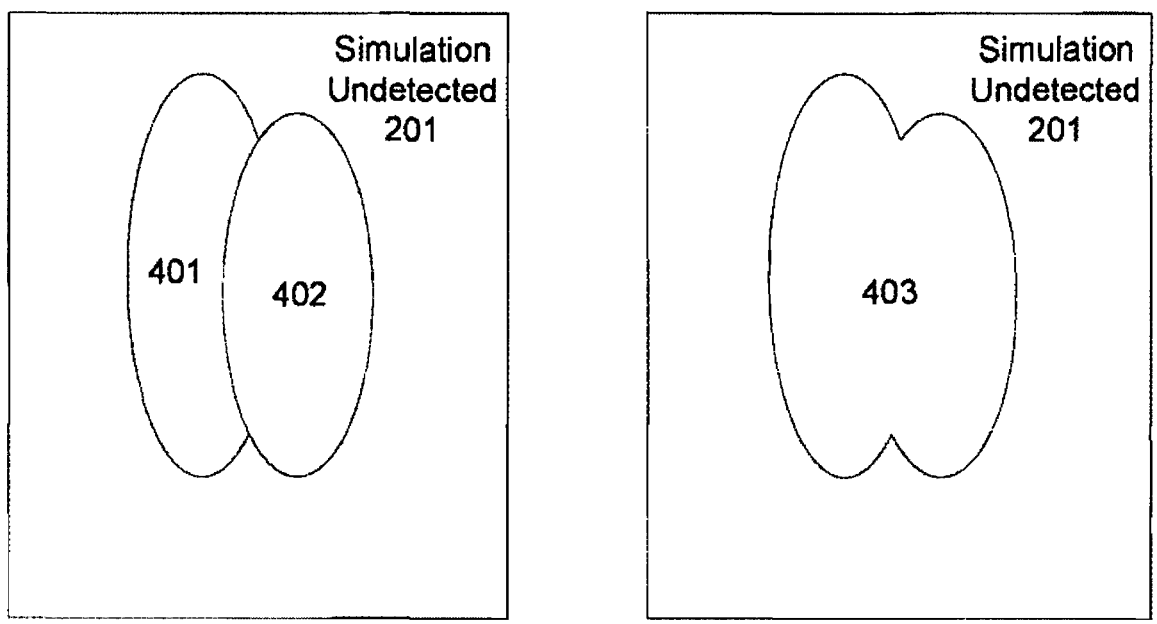
FIG. 4 illustrates an exemplary process of compositing two faults, according to one embodiment.

FIG. 4 illustrates an exemplary process of compositing two faults, according to one embodiment. The interaction between fault components 401 and 402 is ignored, and composite fault 403 is modeled as a union of fault components 401 and 402. A diagnostic score for composite fault 403 is calculated by adding the scores of each fault component assuming that there is no interaction. If there exists an interaction of conflict between fault components 401 and 402 and multiple candidate composite faults, the composite fault that has the minimum number of conflicts is selected for modeling the composite fault.

During a test of a circuit on a circuit tester, failure data are obtained. Failure data include a list of patterns, measure locations, and measured value. During a diagnostic fault simulation, the diagnostic software updates the data per each fault. These data are referred to as callout data. Callout data contains either a count of TFSD 302 or a list of faults that matches the fault detection in the "explains-failures" section. Callout data also contain either a count of TPSD 304 or a list of miscomparing faults in the "conflict" section.

According to one embodiment, information regarding measure location and pattern information where a specific fault was detected is recreated using explains-failures data and conflict count. From this information, two or more faults are unioned, and the diagnostic score for a composite fault is calculated from the unioned fault data. To minimize the size of the callout data, a diagnostic score of a composite fault may be calculated without keeping detailed explains-failures and/or conflict count. In this case, the intersection of the detection of the component faults is assumed to be empty or insignificant. The size of the union of the composite fault is calculated by the sum of the sizes of each fault component.

In one embodiment, instead of determining a cause of a single defect resulting in a fan-out subnet fault, multiple defects of the subnet are combined to better predict the failures. The information to determine which subnet faults contribute to a certain failure at the fan-out can be obtained a priori. However, such a priori information about the defect behavior may not be readily available. Also, it would be difficult to determine which subnet faults to combine to diagnose the failures.

In order to combine subnet faults of a fan-out net, subnet faults are combined as a composite fault and the candidate composite faults are tested to determine how well they match with the defects. Such an approach would require extraordinary computing resources. For example, given n subnet faults in a subnet fault callout and m sets of subnet faults, the computing time to examine every set of m subnet faults would be in the order of (n−m)!. If there are only hundreds or thousands of subnet faults linked to at least one type of failure, it may be possible to analyze sets of two or three subnet faults, but the computational resources required for such analysis an outweigh the expected benefits as the number of subnet faults increases.

According to one embodiment, a multiple subnet fault analysis algorithm is applied with simplifying assumptions when compositing two or more subnet faults. The multiple subnet fault analysis algorithm can efficiently identify many types of single and/or multiple defects at a fan-out net node using various simplifying assumptions. Simplifying assumptions may reduce the accuracy and completeness of the analysis, but allow performing faster analysis with satisfying accuracy. The level and application of simplifying assumptions may be adjusted based on the results of an analysis performed on the failure data with a subnet fault model.

According to one embodiment, only the set of subnet faults that explain every failure measured at a tester is considered. If no such set of subnet faults exists, the multiple subnet fault analysis algorithm produces no answer. If there is at least one set of subnet faults that explains every failure, the multiple subnet fault analysis algorithm identifies the best set of subnet faults that explain all the failures based on the highest diagnostic score.

Initially, the multiple subnet fault analysis algorithm identifies a first set of subnet faults that explains a first failure. The first failure is identified by the explain-fails data obtained from the fault simulation. Each of the subnet faults in the first set is examined to determine if it explains a second failure. If this set of subnet faults explains a second failure as well, a second set of subnet faults that is a subset of the first set is found. This second set of subnet faults explains both the first and second failures. This procedure is repeated to find the final set that explains multiple failures.

The multiple subnet fault analysis algorithm identifies a first unexplained failure in the first set, subsequently in the second set, and so on. If any subnet fault in each set does not explain any subnet fault of an unexplained failure, the set does not qualify for the candidate of the first set. At least one common subnet fault must be included in the set of subnet faults if the set is to explain multiple failures.

According to one embodiment, a recursive routine is employed during a subnet fault composition. A subnet fault is added to a candidate set at each level of recursion. The subnet fault added to the candidate set is chosen because it explains the first unexplained failure. The recursive routine accepts a set of subnet faults as input, finds the first unexplained failure in the input set, and finds a list of subnet faults that explains the first unexplained failure, and recursively calls itself for each subnet fault in this list. If there are no unexplained failures, a candidate set has been found.

The multiple subnet fault analysis algorithm assumes that there are no or minimal overlapping conflicts among the included subnet faults. Every combination of pattern and measure location where at least one subnet fault is detected during a fault simulation is assumed to be unique. This assumption may be inadequate for certain applications, however, it is useful when the percentage of overlapping subnet faults is relatively small and the subnet faults are not logically related to each other. The multiple subnet fault analysis algorithm identifies logically unrelated sets of subnet faults as best candidates.

The assumption for no overlapping conflict improves the performance of creating composite sets of subnet faults. The number of conflicts may be larger than the number of failures explained by any given subnet fault. The compositing of multiple subnet faults takes a set union of the conflicts as well as the explain-fails data. If the number of the failures explained by a subnet fault is relatively small, performing a union of two subnet faults would not take much time whereas performing a union of conflict count may be resource-intensive and time consuming. The assumption for no overlapping conflict allows for approximating the number of conflicts by taking the mathematical sum of the number of conflicts of each component of the composite subnet fault.

If the sets of subnet faults that explain all the failures are considered, i.e., the subnet fault model is perfect, their TF counts are the same as their TFSD counts. For example, two different composite sets of subnet faults have different diagnostic scores if their TPSD (the count of the number of conflicts) is different. The set of subnet faults that has a higher TPSD count will score lower than the set of subnet faults that has a lower TPSD count. Since a new subnet fault added to the list of subnet faults only increases the TPSD count, the set of subnet faults that explains all the failures and has the minimum number of conflicts, i.e., the lowest TPSD count) is selected among the candidate sets. If any candidate set of subnet faults has a conflict count higher than this minimum number of conflicts, this candidate set scores lower than a previously discovered set of subnet faults.

Initially, the minimum number of conflicts is set to infinity. After selecting a first set of subnet faults, the minimum number of conflicts is set to the conflict count of the first set of subnet faults. As the algorithm continues to search for other sets of subnet faults that explain all the failures, the conflict count of any given set of subnet faults is compared to the minimum conflict count, and updated accordingly. If the conflict count of a particular set of subnet faults exceeds the current minimum count, that particular set of subnet faults is no longer considered.

If any set of subnet faults that explains all the failures is found and its conflict count is less than the minimum conflict count, the set achieves a better diagnostic score than the previous sets. The minimum conflict count is updated, and the process continues. The algorithm searches only for a set of subnet faults that explain all the failures, and better matches the signature of the subnet faults than any previous sets of subnet faults. As the minimum conflict count drops, fewer and fewer possible combinations of subnet faults are analyzed, and the algorithm completes the analysis quickly.

Figure 5:
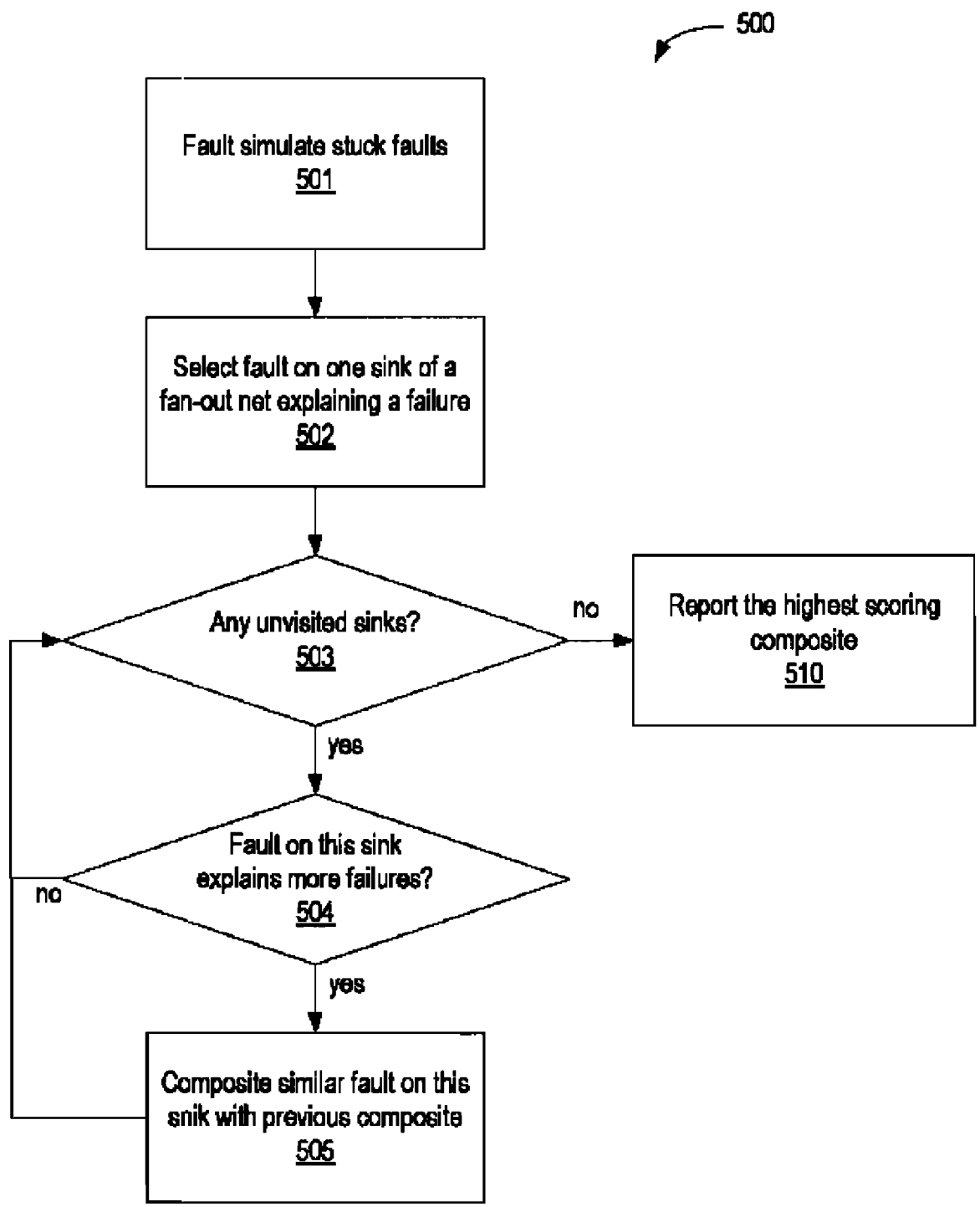
FIG. 5 illustrates an exemplary flow of the recursive routine of a multiple subnet fault analysis algorithm, according to one embodiment.

FIG. 5 illustrates an exemplary flow of the recursive routine of a multiple subnet fault analysis algorithm, according to one embodiment. Recursive routine 500 is called with an empty set of subnet faults to start and with the minimum conflict count set to a large number. Fault simulation is performed, and callout data including a list of subnet faults is received (501). A set of subnet faults diagnosing a first failure is selected from the subnet fault list of the callout data (502). The selected set of subnet faults is initially set to the composite subnet fault that is to be determined by the recursive routine 500. This set of subnet faults may be selected on one sink of a fan-out net. In the selected set of subnet faults, an unvisited failure is identified that is not explained by the first failure (503). The routine 500 checks whether the composite subnet fault explains more failures than the unvisited failure (504). If the answer is yes, the unvisited subnet fault is composited with the current composite subnet fault (505); otherwise, the test for unvisited subnet fault is performed again on the next unvisited subnet fault (503). These steps of 503-505 are repeated until all the unvisited subnet faults are considered, and the highest scoring composite (e.g., lowest conflict count) is reported (510).

The following example demonstrates the multiple subnet fault analysis algorithm applied to a small set of call-out data. The multiple subnet fault analysis algorithm uses each subnet fault's explain-failures data, as well as conflict counts. TPSD count may be used instead of conflict counts.

TABLE 1

| call out faults | Explain Fails | | | | | TPSD |
| | A | B | C | D | E | |
| --- | --- | --- | --- | --- | --- | --- |
| 1 | 0 | 0 | 1 | 1 | 0 | 7 |
| 2 | 1 | 0 | 1 | 0 | 0 | 12 |
| 3 | 1 | 1 | 0 | 0 | 1 | 36 |
| 4 | 0 | 1 | 1 | 0 | 1 | 13 |
| 5 | 0 | 1 | 0 | 1 | 0 | 23 |
| 6 | 1 | 0 | 1 | 0 | 1 | 26 |
| 7 | 0 | 1 | 0 | 0 | 1 | 4 |
| 8 | 0 | 1 | 1 | 1 | 1 | 43 |

Table 1 shows eight subnet faults numbered one through eight, and five failures labeled A, B, C, D, and E. Each subnet fault is associated with one or more failures that the subnet fault explains. The number of conflicts (or TPSD count) is also associated with each subnet fault. The multiple subnet fault analysis algorithm employs a recursive routine that starts with an empty set of subnet faults, and with the minimum conflict count set to a large number (or infinity).

The recursive routine first searches for a first unexplained failure in the empty set, for example, failure A. The recursive routine gets a list of subnet faults that explain failure A, namely subnet faults 2, 3, and 6. Subnet fault 2 is set to the first candidate. The recursive routine makes a new set that includes subnet fault 2 and calls itself recursively.

When the second level of recursion is called with subnet fault 2, the routine looks for the first failure that does not explain subnet fault 2, namely, failure B. The subnet faults that explain failure B are 3, 4, 5, 7 and 8. The routine composites subnet faults 2 and 3 to create the composite set 23 as shown in Table 2.

TABLE 2

| call out faults | Explain Fails | | | | | TPSD |
| | A | B | C | D | E | |
| --- | --- | --- | --- | --- | --- | --- |
| 23 | 1 | 1 | 1 | 0 | 1 | 48 |

The third level of recursion is called with this composite set of failures A and B. The first unexplained fail in this composite is failure D. Subnet faults 1, 5, and 8 explain failure D. A new composite is created from the existing composite and subnet fault 1. The result is shown in Table 3.

TABLE 3

| call out faults | Explain Fails | | | | | TPSD |
| | A | B | C | D | E | |
| --- | --- | --- | --- | --- | --- | --- |
| 123 | 1 | 1 | 1 | 1 | 1 | 55 |

When the recursive routine is called with the 1, 2, 3 composite, no unexplained failure is found. Therefore, the composite set of subnet faults 1, 2, and 3 explains all the failures and the minimum conflict count is set to 55. Since there remain other composites, the routine returns to the third level of recursion. At the third level of recursion, the composite set 23 is considered, and the next subnet fault, fault 5, that explains failure D is tested for combination.

TABLE 4

| call out faults | Explain Fails | | | | | |
|---|---|---|---|---|---|---|
| | A | B | C | D | E | TPSD |
| 235 | 1 | 1 | 1 | 1 | 1 | 71 |

Since TPSD of 71 is greater than the minimum conflict count of 55, the composite 235 is no longer considered. Returning to the third level of recursion, subnet fault 8 is combined with the composite set 23.

TABLE 5

| call out faults | Explain Fails | | | | | |
|---|---|---|---|---|---|---|
| | A | B | C | D | E | TPSD |
| 238 | 1 | 1 | 1 | 1 | 1 | 91 |

Again, TPSD of 91 is higher than the minimum conflict count of 55, so alike the composite 235, the composite 238 is not the best candidate composite set. Since all the subnet faults that explain failures A, B, and D were exhausted at the third level with the composite set 23, the recursive routine returns to the second level. At the second level of recursion, subnet fault 3 was used to explain failure B. So the next subnet fault that explains failure B is tried that is subnet fault 4. The result of compositing subnet faults 2 and 4 are shown in Table 6.

TABLE 6

| call out faults | Explain Fails | | | | | |
|---|---|---|---|---|---|---|
| | A | B | C | D | E | TPSD |
| 24 | 1 | 1 | 1 | 0 | 1 | 25 |

The composite set 24 is passed to the third level of recursion to explain the unexplained failure D since its minimum conflict count of 25 is smaller than that of the composite 23. The subnet faults that explain failure D are subnet faults 1, 5, and 8. The third level of recursion considers subnet faults 1, 5, and 8 that explain failure D.

TABLE 7

| call out faults | Explain Fails | | | | | |
|---|---|---|---|---|---|---|
| | A | B | C | D | E | TPSD |
| 124 | 1 | 1 | 1 | 1 | 1 | 32 |
| 245 | 1 | 1 | 1 | 1 | 1 | 48 |
| 248 | 1 | 1 | 1 | 1 | 1 | 68 |

The composite 124 becomes the new best candidate composite because the minimum conflict count is the smallest of the three. Returning to the second level of recursion again, the recursive routine considers the composite set 25.

TABLE 8

| call out faults | Explain Fails | | | | | |
|---|---|---|---|---|---|---|
| | A | B | C | D | E | TPSD |
| 25 | 1 | 1 | 1 | 1 | 0 | 35 |

Since conflict count of 35 is greater than the minimum conflict count of 25, this composite 25 is dropped. Next, at the second level of the recursion, we combine subnet faults 2 and 7, resulting in the following composite.

TABLE 9

| call out faults | Explain Fails | | | | | |
|---|---|---|---|---|---|---|
| | A | B | C | D | E | TPSD |
| 27 | 1 | 1 | 1 | 0 | 1 | 16 |

The conflict count is 16 and is smaller than the current minimum of 25, the composite set 27 advances to the third level to explain failure D. The third level of recursion looks at the following composites.

TABLE 10

| call out faults | Explain Fails | | | | | |
|---|---|---|---|---|---|---|
| | A | B | C | D | E | TPSD |
| 127 | 1 | 1 | 1 | 1 | 1 | 23 |
| 257 | 1 | 1 | 1 | 1 | 1 | 39 |
| 278 | 1 | 1 | 1 | 1 | 1 | 59 |

The composite set 127 has the smallest conflict count of 23, so it becomes the best candidate. Finally, the recursive routine completes the second level of recursion combining subnet faults 2 and 8.

TABLE 11

| call out faults | Explain Fails | | | | | |
|---|---|---|---|---|---|---|
| | A | B | C | D | E | TPSD |
| 28 | 1 | 1 | 1 | 1 | 1 | 55 |

The conflict count of the composite set 28 is higher than that of the composite set 127, so the composite set 28 is no longer considered. Since the second level of recursion has been exhausted the list of subnet faults that explain failures A and B, the recursive routine returns to the first level. The first level of recursion focused on failure A, and has selected subnet fault 2. The next subnet fault explaining failure A is subnet fault 3. The conflict count of subnet fault 3 is higher than the minimum TPSD of 23, so it is not considered. The same is true with subnet fault 6, so the recursive routine ends with the 1, 2, 7 composite as the best candidate composite set.

The present process of computing a composite diagnostic score for two or more subnet faults allows for efficient diagnosis of certain classes of failures that are not easily diagnosable using conventional simulation techniques. The present process of computing a composite diagnostic score is particularly useful for diagnosing failures occurring with the current technology, density, speed, and power consumption of modern circuits.

Figure 6:
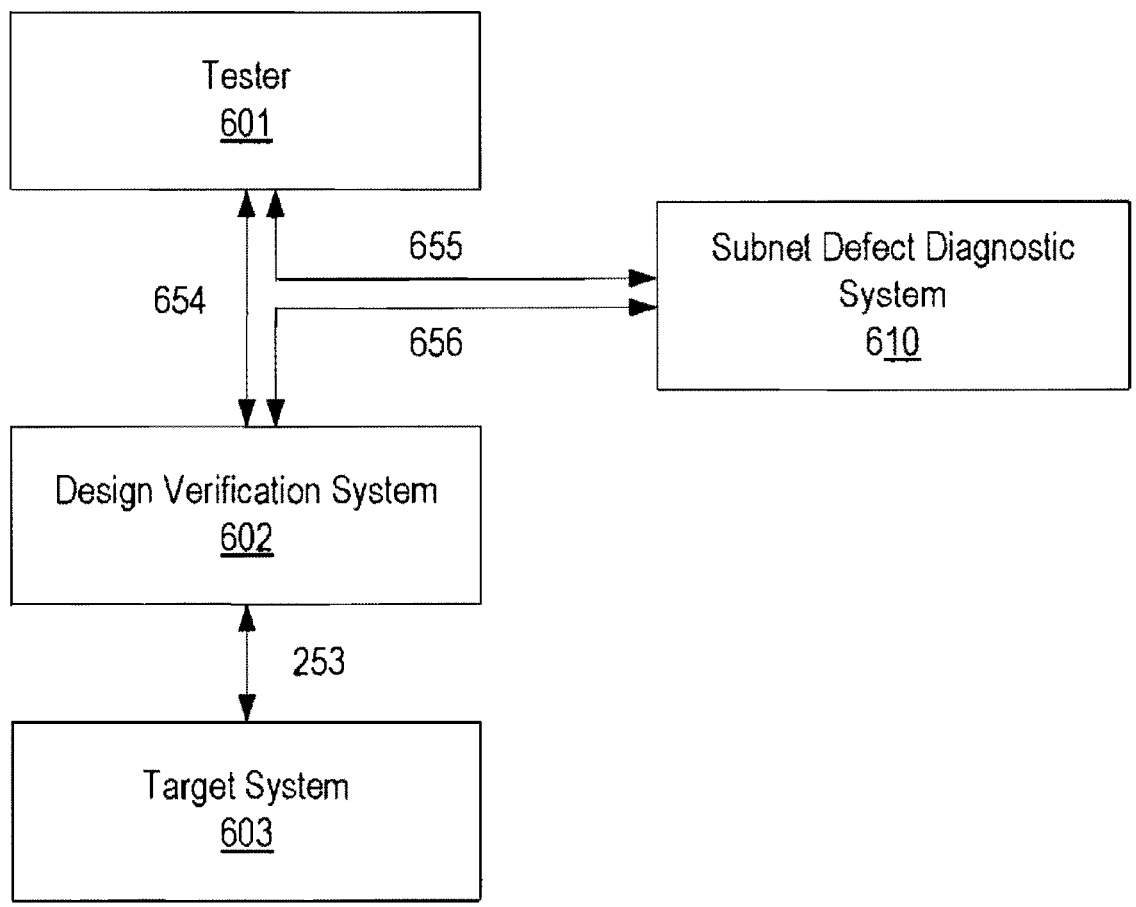
FIG. 6 illustrates an exemplary subnet defect diagnostic system, according to one embodiment.

FIG. 6 illustrates an exemplary subnet defect diagnostic system, according to one embodiment. The above-described subnet fault analysis algorithms through fault compositing can be implemented in a subnet defect diagnostic system 610. Although the subnet defect diagnostic system 610 shown in FIG. 6 is implemented in a separate system that is coupled to the tester 601 and/or the design verification system 602, it may be incorporated, wholly or partially, in a tester 601 or in a design verification system 602 such as a hardware emulator, simulator, and hardware-accelerated simulator systems. The subnet defect diagnostic system 610 includes an interface having an input and an output. The interface applies a plurality of test patterns received at the input from the tester 601 and receives a test result from the circuit. Each of the plurality of test patterns generates a predicted test result when no defect is included in the circuit.

The design verification system 602 may be connected to a target system 603. The target system 603 typically includes multiple devices such as memory, microprocessors, application specific integrated circuits (ASIC), field programmable gate arrays (FPGAs), etc. The target system 603 may also include inputs, outputs corresponding to the inputs and outputs of the integrated circuit being emulated and are in electrical communication with communication link 653.

The processor of the subnet defect diagnostic system 610 performs the diagnostic analysis. The processor receives callout data from tester 601 via communication line 655. The processor selects a first and a second fault on a fan-out sink of a fan-out net contained in the callout data and generates a composite fault by compositing them. The processor further generates a composite conflict count by combining the conflict count from the first and second faults and assigns a score based on the composite conflict count. The processor determines a best candidate composite fault based on the score.

Figure 7:
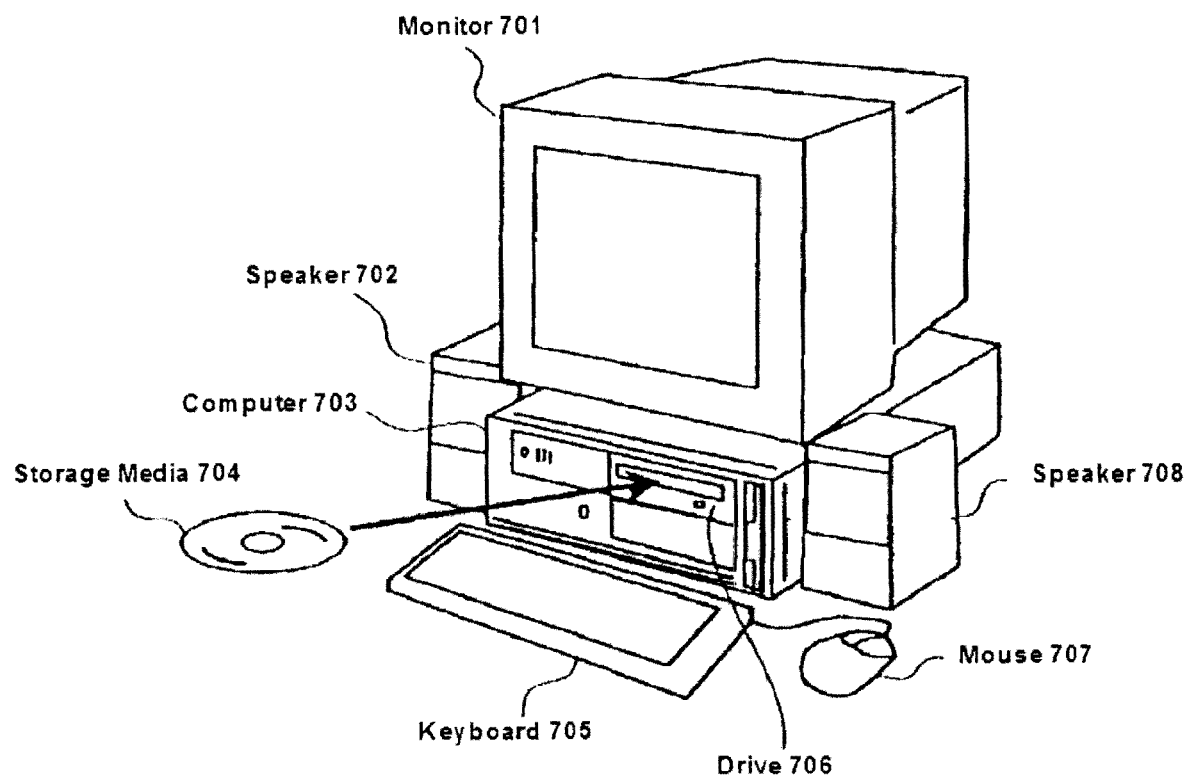
FIG. 7 illustrates an exemplary computer system for reading a computer-readable storage medium, according to one embodiment.

FIG. 7 illustrates an exemplary general-purpose computer system for reading a computer-readable storage medium, according to one embodiment. The computer system comprises a computer 703 configured to read storage media 704 at its drive 706. The computer system further includes a monitor 701 for the user to view visual output from the computer 703, and keyboard 705 and mouse 707 for the user to input data and commands to computer 703. Storage media 704, although illustrated as an optical disk for ease of understanding, may be any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Likewise, drive 706 may be any drive suitable for reading storage media 704 or any interface suitable to couple storage media 704 to the bus of computer 703 when storage media 704 is read.

A method and system for subnet defect diagnostics through fault compositing is disclosed. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

We claim:
1. A computer-implemented method of diagnosing subnet defects, comprising:
  (i) receiving, at a computer, callout data comprising a list of faults, each fault of the list of faults comprising failure data and conflict count, the failure data containing miscomparing measures that each fault models, and a conflict indicating that each fault predicts a failure that was not measured;
  (ii) selecting a first fault on a fan-out sink of a fan-out net, the first fault explaining a first failure of the plurality of failures;
  (iii) selecting a second fault on a different sink of the fan-out net, the second fault explaining a second failure that the first fault does not explain;
  (iv) compositing the first fault and the second fault to yield a composite fault, wherein the composite fault comprises a combination of the failure data and conflict count of the first fault and the failure data and conflict count of the second fault;
  (v) generating a composite conflict count by combining the conflict count of the first fault and the conflict count of the second fault;
  (vi) assigning a score to the composite fault based on the composite conflict count; and
  (vii) determining a best candidate composite fault explaining the first fault and the second fault based on the score.

2. The computer-implemented method of diagnosing subnet defects of claim 1, further comprising repeating (ii) through (vii) until the composite fault explains all of the plurality of failures.

3. The computer-implemented method of diagnosing subnet defects of claim 1, wherein the fault data includes a first count of test-failed (TF) faults, a second count of test-failed, simulation-detected (TFSD) faults, a third count of test-passed, simulation-detected (TPSD) faults.

4. The computer-implemented method of diagnosing subnet defects of claim 1, wherein the score is calculated by $TFSD/(TF+TPSD/a)$, where a is a numerical weighting factor greater than zero, TF is a count of test-failed faults, TFSD is a count of test-failed, simulation-detected faults, and TPSD is a count of test-passed, simulation-detected faults.

5. The computer-implemented method of diagnosing subnet defects of claim 1, further comprising assigning a minimum conflict count to the composite fault.

6. The computer-implemented method of diagnosing subnet defects of claim 5, wherein the score is given a higher value when the composite conflict count is smaller than the minimum conflict count.

7. The computer-implemented method of diagnosing subnet defects of claim 1, wherein the plurality of failures comprises a defect caused by an inverting fault.

8. The computer-implemented method of diagnosing subnet defects of claim 7, wherein the inverting fault is caused by a shorted net.

9. The computer-implemented method of diagnosing subnet defects of claim 1, wherein the plurality of failures comprises a timing defect.

10. The computer-implemented method of diagnosing subnet defects of claim 1, wherein the first fault and the second fault are logically unrelated.

11. A computer-readable storage medium having stored thereon a plurality of instructions, said plurality of instructions when executed by a computer, cause said computer to perform:
  (i) receiving callout data comprising a list of faults, each fault of the list of faults comprising failure data and conflict count, the failure data containing miscomparing measures that each fault models, and a conflict indicating that each fault predicts a failure that was not measured;
  (ii) selecting a first fault on a fan-out sink of a fan-out net, the first fault explaining a first failure of the plurality of failures;
  (iii) selecting a second fault on a different sink of the fan-out net, the second fault explaining a second failure that the first fault does not explain;
  (iv) compositing the first fault and the second fault to yield a composite fault, wherein the composite fault comprises a combination of the failure data and conflict count of the first fault and the failure data and conflict count of the second fault;

(v) generating a composite conflict count by combining the conflict count of the first fault and the conflict count of the second fault;
(vi) assigning a score to the composite fault based on the composite conflict count; and
(vii) determining a best candidate composite fault explaining the first fault and the second fault based on the score.

12. The computer-readable storage medium of claim 11, having stored thereon a plurality of instructions, said plurality of instructions when executed by a computer, cause said computer to further perform repeating (ii) through (vii) until the composite fault explains all of the plurality of failures.

13. The computer-readable storage medium of claim 11, wherein the fault data includes a first count of test-failed (TF) faults, a second count of test-failed, simulation-detected (TFSD) faults, a third count of test-passed, simulation-detected (TPSD) faults.

14. The computer-readable storage medium of claim 11, wherein the score is calculated by $TFSD/(TF+TPSD/a)$, where a is a numerical weighting factor greater than zero, TF is a count of test-failed faults, TFSD is a count of test-failed, simulation-detected faults, and TPSD is a count of test-passed, simulation-detected faults.

15. The computer-readable storage medium of claim 11, having stored thereon a plurality of instructions, said plurality of instructions when executed by a computer, cause said computer to further perform assigning a minimum conflict count to the composite fault.

16. The computer-readable storage medium of claim 15, wherein the score is given a higher value when the composite conflict count is smaller than the minimum conflict count.

17. The computer-readable storage medium of claim 11, wherein the plurality of failures comprises a defect caused by an inverting fault.

18. The computer-readable storage medium of claim 17, wherein the inverting fault is caused by a shorted net.

19. The computer-readable storage medium of claim 11, wherein the plurality of failures comprises a timing defect.

20. The computer-readable storage medium of claim 11, wherein the first fault and the second fault are logically unrelated.

21. A diagnostic system for fault compositing, the diagnostic system comprising:
(i) an input for receiving callout data from a tester, the callout data comprising a list of faults, and each fault of the list of faults comprising failure data and conflict count, wherein the failure data contains miscomparing measures that each fault models, and a conflict indicates that each fault predicts a failure that was not measured;
(ii) means for compositing a first fault and a second fault to yield a composite fault, wherein the first fault is selected on a fan-out sink of a fan-out net, the first fault explaining a first failure of the plurality of failures, the second fault is selected on a different sink of the fan-out net, the second fault explaining a second failure that the first fault does not explain, and the composite fault comprises a combination of the failure data and conflict count of the first fault and the failure data and conflict count of the second fault;
(iii) means for generating a composite conflict count by combining the conflict count of the first fault and the conflict count of the second fault;
(iv) means for assigning a score to the composite fault based on the composite conflict count; and
(v) means for determining a best candidate composite fault explaining the first fault and the second fault based on the score.

* * * * *